United States Patent [19]

Earl et al.

[11] 4,362,067
[45] Dec. 7, 1982

[54] VARIABLE AUTHORITY TRIM MIXER

[75] Inventors: Robert W. Earl, Palos Verdes Estates; William H. McCormack, Rancho Palos Verdes, both of Calif.

[73] Assignee: The Garrett Corporation, Los Angeles, Calif.

[21] Appl. No.: 180,224

[22] Filed: Aug. 21, 1980

[51] Int. Cl.³ .................. G05G 11/00; F02C 9/28
[52] U.S. Cl. .................. 74/479; 60/39.28 R; 244/76 R; 251/130
[58] Field of Search ........... 74/479; 60/39.28 R; 123/352; 244/76 R; 251/130

[56] References Cited

U.S. PATENT DOCUMENTS

| | | | |
|---|---|---|---|
| 1,833,039 | 11/1931 | Purdy | 74/832 |
| 2,604,756 | 7/1952 | Greenland | 60/39.28 R |
| 2,796,774 | 6/1957 | Peed, Jr. | 74/522 |
| 2,814,957 | 12/1957 | Mitrovich | 74/471 |
| 2,871,657 | 2/1959 | Oates et al. | 60/35.6 |
| 2,881,632 | 4/1959 | Woodward | 74/471 |
| 2,910,886 | 11/1959 | Polleys | 74/480 |
| 2,935,136 | 5/1960 | Wall et al. | 170/135.74 |
| 3,166,272 | 1/1965 | Liddell et al. | 244/42 |
| 3,168,265 | 2/1965 | Pfaff et al. | 244/76 |
| 3,204,885 | 9/1965 | Silfhout | 242/43 |
| 3,279,184 | 10/1966 | Felix et al. | 60/230 |
| 3,399,528 | 9/1968 | Warne | 60/39.28 R |
| 3,451,286 | 6/1969 | Bloom | 74/479 |
| 3,611,828 | 10/1971 | Maroshick | 74/479 |
| 3,618,419 | 11/1971 | Maroshick | 74/479 |
| 3,641,833 | 2/1972 | Maroshick | 74/479 |
| 3,789,692 | 2/1974 | Farr et al. | 74/480 R |
| 3,864,914 | 2/1975 | Timmins | 60/434 |
| 3,897,695 | 8/1975 | Rostad | 74/516 |
| 3,910,133 | 10/1975 | Oestmann | 74/479 |
| 4,088,039 | 5/1978 | Bolang et al. | 74/479 |

FOREIGN PATENT DOCUMENTS

| | | | |
|---|---|---|---|
| 629639 | 9/1949 | United Kingdom | 60/39.28 R |
| 781481 | 8/1957 | United Kingdom | 60/39.28 R |

Primary Examiner—Allan D. Herrmann
Attorney, Agent, or Firm—Joseph A. Yanny; Albert J. Miller; James W. McFarland

[57] ABSTRACT

A mechanical variable authority trim mixer for controlling the flow of fuel to an engine receives a main input from the throttle lever and a second input from a trim actuator motor. The trim mixer combines the inputs to produce a single output operably connected to the fuel metering control of the engine. A programmed cam modifies or neutralizes the effects of the trim input through selected ranges of the main throttle input stroke.

26 Claims, 14 Drawing Figures

VARIABLE AUTHORITY TRIM MIXER

This invention relates to a mechanical variable authority trim mixer which acts to combine a primary mechanical input from a throttle, a secondary mechanical input from a fuel trimming actuator and a third input from a cam element which modifies or neutralizes the authority of the trim actuator through selected ranges of the throttle stroke to produce a single output which is conveyed to a fuel metering control system associated with an engine, and more particularly, to a variable authority trim mixer of the described type for use as a fuel control linkage member in an aircraft which modifies or neutralizes the authority of the trim actuator to influence the output when the primary throttle is in critical areas of its stroke.

A wide variety of devices are used to communicate a desired throttle setting from the throttle quadrant of an aircraft to the fuel control associated with the engine. Typically, direct mechanical or electronic linkage between the throttle and fuel control have been employed to control the amount of fuel which is provided to an engine to provide control based upon speed, temperature, or other selected engine parameters.

It has been found to be desirable to trim, or automatically fine tune, the amount of fuel delivered to the engine without direct pilot movement of the throttles and without the use of an autothrottle. This allows the pilot to select an appropriate throttle setting for each flight mode and then turn his attention to other duties while the engine is automatically trimmed. An engine management system for accomplishing this is disclosed in PCT Patent Application Ser. No. 80/01065 entitled "Engine Management System" by Leon D. Lewis and filed concurrently herewith.

In such a system, particular care must be taken to control the engine when the throttle setting is near the upper or lower end of the throttle stroke, inasmuch as there is a higher possibility that a system malfunction could cause a loss of maximum thrust or an overspeed condition of the engine at the high end, or alternatively, a flameout at the low end.

In summary, the present invention provides for a mechanical variable authority trim mixer which acts as a linkage member to control the flow of fuel to an engine. The mixer receives a main input from the throttle lever position which corresponds to a preferred fuel flow rate command. A second or trimming input is supplied to the mixer from a trim actuator to adjust the fuel flow rate to the requirements of the engine without movement of the throttle lever by the pilot or an autothrottle. A third input, which is dependent upon the throttle lever position, is supplied to the mixer via a programmed cam to modify or neutralize the effects of the trim input when the throttle lever is in selected critical areas of its stroke. The trim mixer is designed to combine the three inputs to produce a single output which is mechanically transmitted to a fuel metering control which is associated with the engine to meter the flow of fuel to the engine. The mixer is designed to provide for throughput of the throttle lever command even in the event of trim actuator failure.

The advantages of the variable authority trim mixer of the present invention may be best understood when the following specification is considered in conjunction with the appended drawings wherein:

FIGS. 7 and 9 are top plan views.

Figure 1:
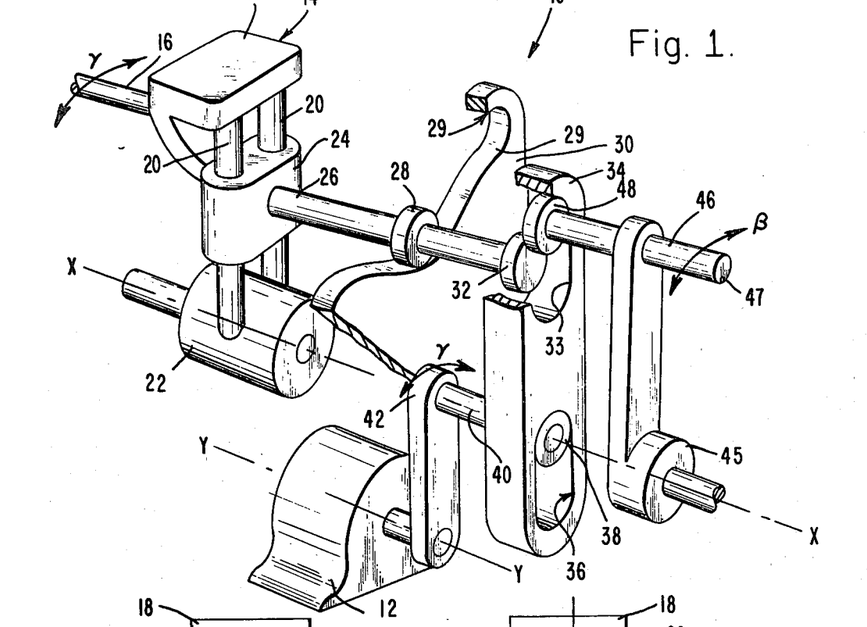
FIG. 1 is a partially broken away isometric view of a first embodiment of the variable authority trim mixer, in accordance with the present invention.
Figure 13:
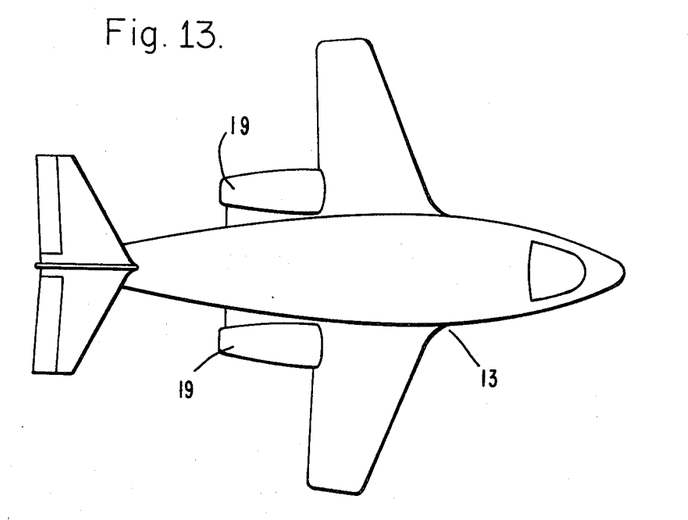
FIG. 13 is a top plan view of an aircraft which utilizes the trim mixer of the present invention.
Figure 14:
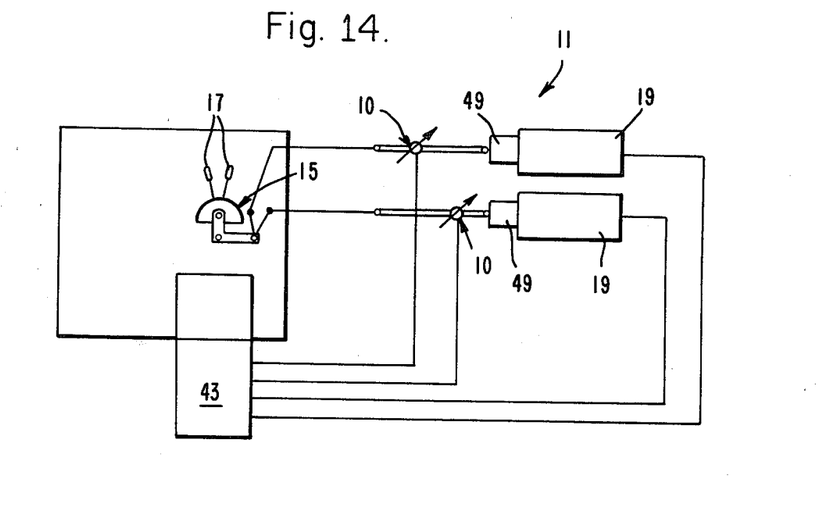
FIG. 14 is a block diagram of a fuel control system which utilizes the trim mixer of the present invention.

Referring now to the drawings, FIGS. 1, 13 and 14 show a first embodiment of the variable authority trim mixer, generally designated by the reference numeral 10, of the present invention and its position in a fuel control system 11, for combining an angular input $\alpha$ from a throttle quadrant 15 of an aircraft 13 with a second angular input $a$, from a trim actuator motor 12, to derive an output angular movement $\beta$ which is communicated to a fuel control device adjacent an engine to thereby control the amount of fuel which is delivered thereto. As shown in FIG. 14, in a multiple engine aircraft, wherein the throttle quadrant 15, contains a throttle lever 17 for each engine 19, a variable authority trim mixer 10 will be interposed in the drive linkage between each throttle lever 17 and engine 19.

The variable authority trim mixer 10 includes a throttle input arm 14, which is designed to rotate about an axis XX, which in turn, is fixed relative to ground as established by the aircraft 13 on which the mixer is used. The positioning of each throttle lever 17 relative to its limits of movement, causes a proportional positioning of the throttle input arm 14 between its extreme limits of movement. This is accomplished by transferring the angular motion of the throttle lever 17 to the throttle input arm 14, by a control cable or other means well known to those skilled in the art, to thereby cause forces to be applied to a protuberance 16 which is integrally formed with a cap 18 of the throttle input arm 14. Two generally parallel linear guides 20 interconnect the cap 18 and a hub 22. As is shown in FIG. 1, the axis of the hub 22 is coextensive with axis XX to allow throttle input arm 14 to rotate thereabout.

A bored reciprocable block 24 is arranged on the guides 20 of the throttle input arm 14 so as to be slidable axially thereon. A throttle dowel 26 is suitably secured to the bored reciprocal block 24 in a fixed relationship thereto to be movable therewith. A follower 28 is suitably constrained to an area of the throttle dowel 26 so as to ride upon surfaces 29 of a cam element 30. It is the shape and contour of the surfaces 29 of the cam 30 which determine and define the authority for trim as will be more fully described herein below.

A throttle head 32 is provided on the end of the throttle dowel 26 furthest from the bored reciprocable block 24 to ride in an elongated slot 33 of an input mixing arm 34. A second elongated slot 36 is provided at the opposite end of the elongated mixing arm 34 and receives a trimming head 38 of a trimming dowel 40. The trimming dowel 40 is rigidly affixed near one end of a trim input arm 42 which may be rotated about an axis YY by the trim actuator motor 12.

An output arm 44 is integrally formed with an output hub 45 and suitably journaled with respect to axis XX to rotate thereabout. An output dowel 46 is affixed near the upper end of the output arm 44 and includes an output head 48 which also rides in elongated slot 33, but offset from throttle head 32, to allow both heads 48 and 32 to ride the full length of slot 33. An end 47 of the output dowel 46 opposite the output head 48 is suitably and operably connected to fuel metering device 49 (FIG. 14) to control the fuel flow to the engine in response to the position of output arm 44. Suitable coverings not shown in the drawings may be placed over the end of mixer arm 34 to prevent the removal of the heads 48, 32, and 38 from the slots 33 and 36.

The operation of the first embodiment is more readily understood by reference to FIGS. 1 through 5 and 14. The variable authority trim mixer 10 receives an angular input $\alpha$ from the throttle quadrant 15 by positioning of the throttle levers 17 of the aircraft 13 and causes corresponding rotation of the throttle input arm 14 about axis XX. This movement of the throttle input arm 14 causes throttle dowel 26 to impart a desired rotation to the mixer arm 34 about the axis of the trim dowel 40. As is readily apparent, this movement translates the axis of throttle dowel 26 through a variety of selected positions and also rotates output dowel 46 of output arm 44 to impart the desired effect upon the fuel metering device of the engine in direct response to the throttle quadrant input $\alpha$. After the throttle lever 17 is set to a desired position, it is locked against motion by the variable authority trim mixer 10 through the use of means such as throttle locking mechanisms, "no backs" or even drag associated with the throttle linkage leading to the mixer if sufficient.

As previously discussed, it is desireable to be able to trim the amount of fuel which is delivered to the engine either above or below that which has been indicated by the pilot as the desired fuel flow rate by his throttle 17 setting, without pilot or autothrottle manipulation or movement of the throttle levers 17. This is accomplished in the variable authority trim mixer 10 through the activation of trim motor 12, via the use of electric current inputs thereto from an electronic control system 43 (FIG. 14), such as that described in the aforementioned copending patent application. Activation of the trim motor 12 causes rotation of trim input arm 42 from its centered or nonactivated position to a commanded position such as from the position shown in FIG. 2 to the position shown in FIG. 3. This rotation causes a corresponding motion of trimming dowel 40 and trimming head 38 within the second elongated slot 36 to pivot the mixer arm 34 about the axis of the throttle dowel and head 26 and 32 which remains fixed.

When the throttle input arm 14 is moved through its operating range, cam surface 29 of cam 30 causes a programmed motion of cam follower 28 and throttle dowel 26 such that block 24 moves radially outward or radially inward along the linear guides 20 on the throttle input arm 14. Corresponding motion of the throttle head 32 and the throttle dowel 26 occurs, causing it to approach alignment with output head 48 of the output dowel 46. In the preferred embodiment, the cam 30 is constructed so that heads 32 and 48, and accordingly dowels 26 and 46, become axially aligned near the end portions of the permissible motion of the throttle input arm 14 and are out of alignment through the remainder of the permissible motion of the input arm 14 stroke.

Figure 2:
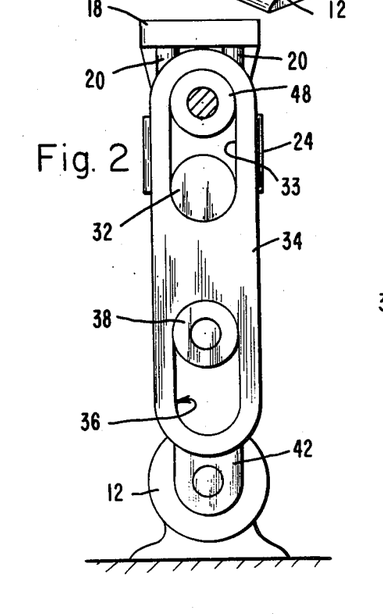
FIGS. 2–5 are partially broken away front elevational views of selected parts of the variable authority trim mixer of FIG. 1, showing various operational configurations thereof.
Figure 3:
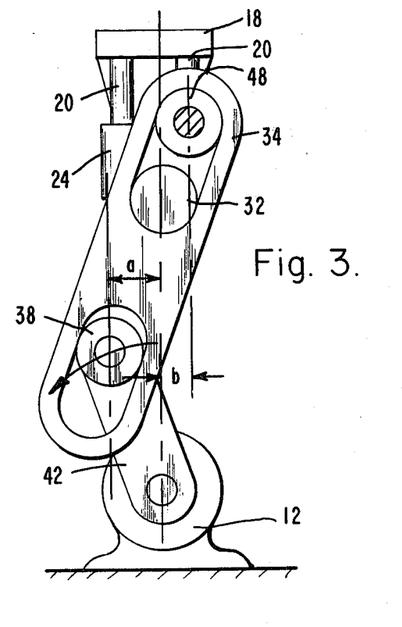

FIGS. 2 and 3 illustrate fuel control triming operation of the variable authority trim mixer 10 when the throttle input arm 14 is in the range intermediate the extreme ends of its stroke wherein the axes of throttle dowel 26 and head 32 are in a non-coincident relationship with the axes of output dowel 46 and head 48 of the output arm 44.

FIG. 2 shows the throttle input arm 14 in the center of its stroke where, in this embodiment (see FIG. 1), the shape of the cam 30 produces the greatest distance between the axes of dowels 26 and 46. The output arm 44 which is illustrated by the head 48 (in FIGS. 2 & 3) of output arm dowel 46, is seen to be in alignment with throttle input arm 14. This alignment results from an absence of trimming operation by the trim motor 12 as can be seen from the vertical orientation of the trim arm 42.

If a system for controlling throttle trim operation demands fuel flow at a rate greater than that requested by the flight crew through positioning of the throttle lever 17, a command signal will be sent to the trim motor 12 to produce a counter clockwise rotation of the trim arm 42, such as to the position illustrated in FIG. 3. This causes the lower portion of the input mixing arm 34 to be displaced to the left as shown in FIG. 3 and changes the angular position of the axis of the elongated slot 33. As a result, the relative positions of heads 32 and 48 must shift as they are physically constrained to remain in alignment along the axis of the elongated slot mixing arm 34.

Because of the physical construction of the fuel control system, and the trim mixer 10, the throttle dowel 26 and its head 32 are held in position much more firmly than are the dowel 46 and head 48 of the output arm 44. Thus, the output head 48 will be displaced to the right as seen in the figure by a predetermined amount "b" corresponding to the action of the trim motor 12, and the displacement of the trimming head 38 by an amount "a" while the throttle head 32, and correspondingly the throttle input arm 14 and cockpit power lever 17, will remain unmoved. The resulting displacement between the throttle input arm 14 and output arm 44 causes the rate of fuel flow to be increased by the desired amount. It will be readily apparent that rotation of the trim motor 12 in the opposite direction will produce a resultant decrease in the rate of fuel flow without any motion of the power levers 17.

As the input arm 14 moves away from the position shown in FIGS. 1-3, interaction of the cam 30 and cam follower 28 will move the axis of dowels 26 and 46 closer together. This will bring the axes of dowels 26 and 46 closer together and result in the amount of change in position of the output lever 44 corresponding to action of the trim motor 12 being reduced. Thus, by providing a suitable shape for the cam surface 29, the trim authority limits can be precisely defined.

Figure 12:
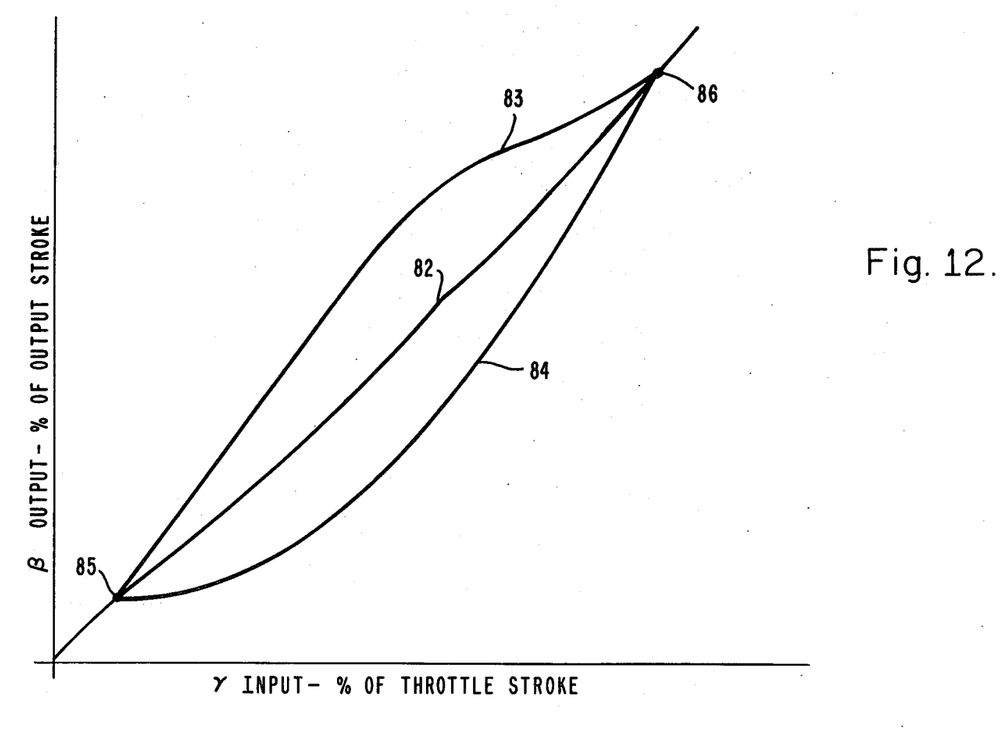
FIG. 12 is a graph illustrating the operation of the variable authority trim mixer of the present invention.

While many cam shapes and corresponding trim authority envelopes are possible, FIG. 12 illustrates a typical curve wherein position of the throttle input arm 14 is plotted along the horizontal axis and position of the output arm 44 is plotted along the vertical axis. A line 82 illustrates the coordinated motion of input and output arms without any trimming thereof. Curves 83 and 84 illustrate the authority limits of trim operation permitted by the variable authority trim mixer 10 as programmed through control of the shape of the cam surface 29. The lower portions of cam surface 29 where the heads 32 and 48 are caused to be more widely spaced, permit greater excursions from line 82 while the higher portions where heads 32 and 48 are caused to be closest, permit reduced excursions from line 82.

It is also desireable to terminate the ability of trim motor 12 to affect the position of output dowel 46 and the output arm 44 when the throttle input arm 14, is in selected critical portions of its stroke, such as outside the points 85 and 86 on line 82 of FIG. 12. This is accomplished by designing cam 30, so that it will align the axis of throttle dowel 26 and head 32 with those of output dowel 46 and head 48 during the critical portions of the stroke.

Figures 4, 5:
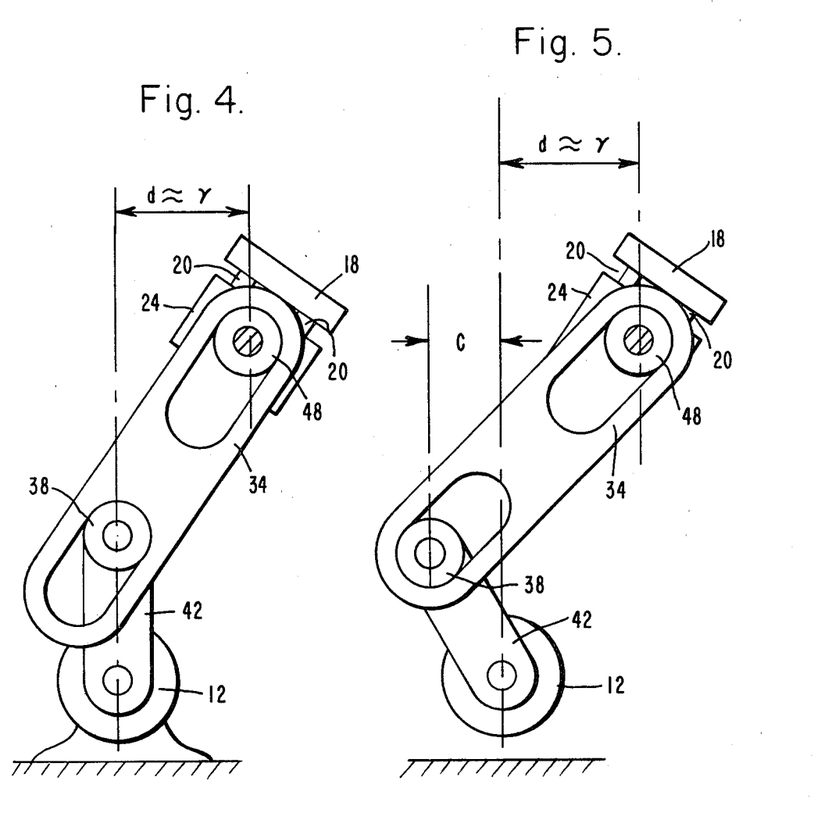

This situation is depicted in FIGS. 4 and 5, which illustrates the throttle input arm 14 and correspondingly the output arm 44 as having been rotated to near the extreme upper end of its stroke.

In FIG. 4, the trim arm 42 is shown in a vertical orientation which, as discussed with respect to FIGS. 2 and 3 is the centered position which does not produce any change in relative position of the output arm 44 and throttle input arm 14. Thus, throttle input arm 14 and output arm 44 are aligned.

In FIG. 5, the trim motor 12 has caused the trim arm 42 to rotate in the same manner as shown in FIG. 3 and displace the trim head 38 a distance "c" from its center line. This motion demands an increase in the rate of fuel flow beyond that requested by the position of the throttle levers 17. While the mixer arm 34 does rotate, as in FIG. 3, around the stationary throttle head 32 of dowel 26, this does not cause any change in position of the output arm 44 or dowel 46 because of the axial alignment of the dowels 46 and 26. Thus, regardless of the amount of trimming called for by action of the trim motor 12, and the corresponding displacement of the trimming head 38, by an amount "c" from its centered position, the output arm 44 will remain aligned with the throttle input arm 14 so that fuel is fed to the engines precisely as demanded by the flight crew at critical portions of the power lever stroke at which the cam 30 is programmed to cause axial alignment of dowels 26 and 46. This is graphically illustrated in FIGS. 4 and 5 by the fact that output head 48 remains at a fixed distance "d" from its midstroke position with and without trimming.

Figure 6:
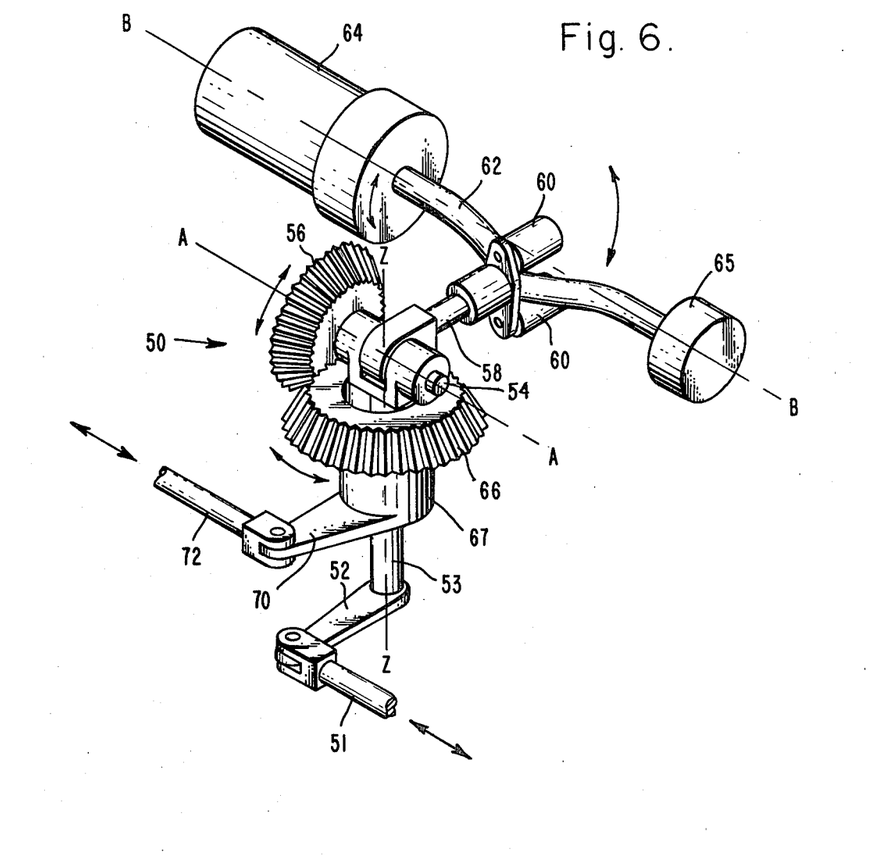
FIG. 6 is an isometric view of a second embodiment of the present invention.

Referring now to FIG. 6, an alternative embodiment of the variable authority trim mixer of the present invention is shown, generally designated by the reference numeral 50. A throttle input arm 52 receives an input from linkage member 51 which is connected at one end to one of the throttle levers 17 of aircraft 13, in a manner previously described, so as to rotate a shaft 53 which is affixed to the other end of throttle input arm 52, about an axis ZZ which is fixed with reference to ground. As the drawings illustrate, the top of shaft 53 is suitably constructed to receive and hold a shaft 54 for rotation about an axis AA. Axis AA forms a right angle with axis ZZ. A generally vertical bevel gear 56 is suitably secured to the end of shaft 54 to rotate therewith.

One end of a trim input arm 58 is preferably bored, placed on shaft 54, and pinned thereto so as to be locked in a fixed relationship with respect thereto to hold shaft 54 atop shaft 53. A pair of spaced followers 60 are affixed to the opposite end of the shaft 58 and axially extend generally parallel thereto to wipe across a cam element 62.

The cam element 62 is a rod which preferably has straight end portions and a central portion which may be bowed either towards or away from shaft 58, and is affixed for rotation at one end to a trim motor 64, (operation of which is similar to that of the trim motor 12 of the previous embodiment) and is mounted on suitable bearings 65 at its other end. If desired, a feedback sensor (not shown) may be used to sense the position of the cam for control purposes.

Cam 62 is mounted for rotation about an axis BB. Cam 62 both activates the trim input arm 58 and by virtue of its shape contains the authority limits for trim input as will be more fully described herein below.

A second bevel gear 66 is provided atop a hub 67 and both are concentrically arranged about axis ZZ outside shaft 53 to be rotatable thereabout. Suitable bearing members are arranged in an inner cavity (not shown) of hub 67 to allow hub 67 to be rotated independently of shaft 53. Bevel gear 66 is in constant toothed engagement with bevel gear 56 and suitable means (not shown) are applied to maintain that relationship.

An output arm 70 is suitably secured to or integrally formed with hub 67 to be rotatable therewith. Affixed to the opposite end of output arm 70 is a linkage member 72 which is connected to the fuel metering device 49 (FIG. 14).

In operation, motion of the engine control power lever 17 is conveyed through linkage member 51 and throttle input arm 52 to shaft 53 which rotates about axis ZZ. As a result, cam followers 60 also rotate around axis ZZ so as to move laterally along cam element 62. Assuming cam element 62 to be in the centered position shown in FIG. 6 with the bowed central portion extending directly toward the shaft 58, action of the output arm 70 will not be affected by the cam element. Bevel gear 56 is also caused to move about axis ZZ without rotating about axis AA. However, because it is fixed to shaft 54 which is in turn pinned to trim input arm 58, bevel gear 56 will not rotate about its axis AA. Bevel gear 56 remains engaged with gear 66 and forces gear 66 to rotate about axis ZZ by an equal amount. This motion rotates hub 67 such that output arm 70 moves linkage member 72 to adjust the fuel metering device 49 (FIG. 14) in direct response to throttle lever 17 position.

The operation described is without trim action and results in motion of the linkage member 72 which is coincident with the motion of linkage member 51. Thus, the distance between throttle input arm 52 and output arm 70, as indicated by the distance "e" in FIG. 7, remains unchanged. Action of the cam motor 64 in response to a suitable control system can act to change this distance and change the rate of fuel flow resulting from a set position of the engine power levers 17.

Figure 7:
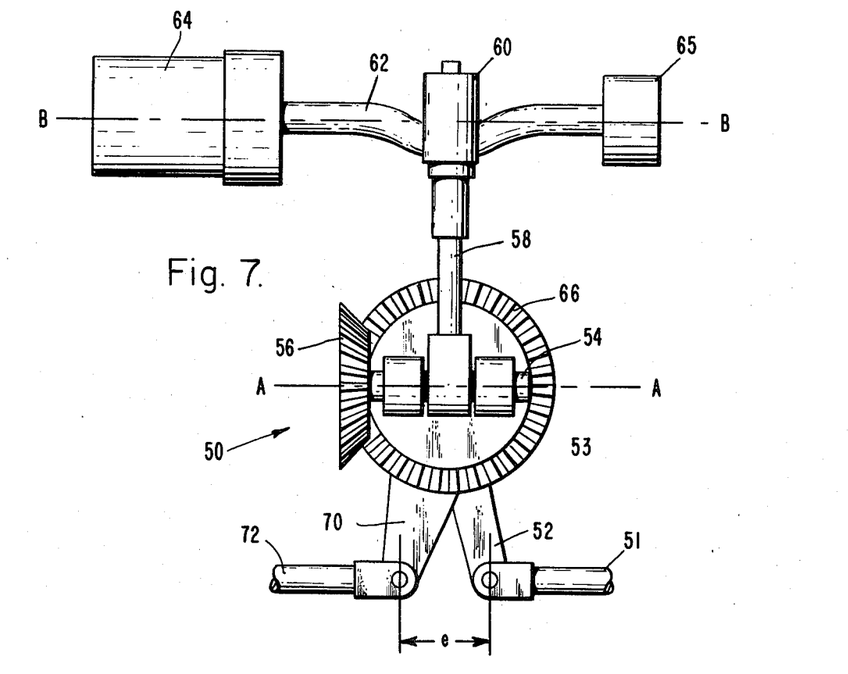
Figure 8:
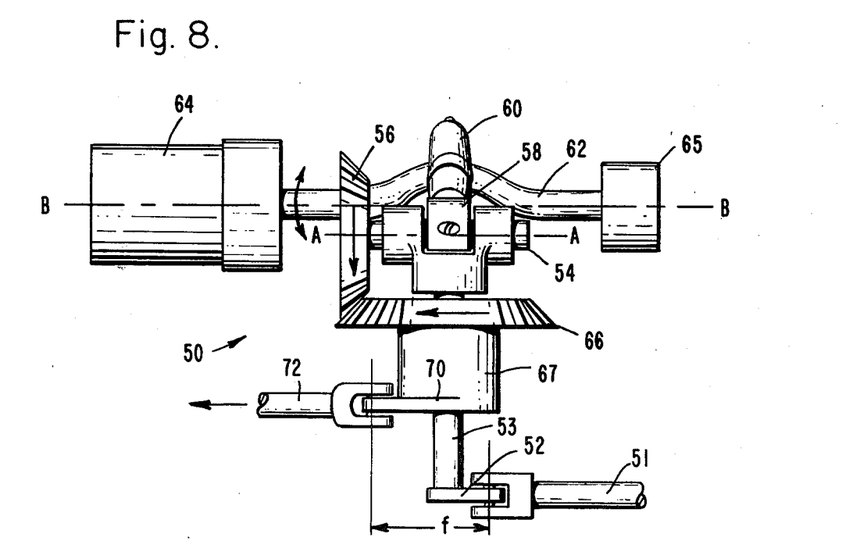
FIGS. 8 and 10 are elevational views of the device of FIG. 6 illustrating various operational configurations thereof.

The trimming operation of the second embodiment of the present invention is best understood by reference to FIGS. 7-10. Referring specifically to FIGS. 7 and 8, the relative position of the individual elements of the second embodiment are shown when the throttle lever 17 is generally midway through its stroke. The throttle lever 17 position setting has imparted through linkage member 51, throttle input arm 52, and shaft 53, a sufficient rotation of shaft 53 to cause axis AA to be generally parallel with axis BB. When this alignment occurs, followers 60, which are affixed to the end of shaft 58, are generally intermediate the ends of cam elements 62.

FIG. 7 shows the cam element 62 in its generally flattened, centered position. FIG. 8 shows the cam element 62 as rotated from its centered position in FIG. 7 through an angle of sufficient degree to thereby pivot followers 60, shaft 58, shaft 54 and bevel gear 56 about axis AA. This rotation does not affect the position of the throttle levers 17, shaft 53, throttle input arm 52 or linkage member 51 because the throttle input arm 52 has been relatively locked through proper manipulation of locking mechanisms at the throttle quadrant 15 and the high amount of drag associated with the linkage connecting throttle levers 17, with the trim mixers. However, this rotation of the aforementioned elements about axis AA, and more specifically bevel gear 56, causes bevel gear 66, hub 67 and output arm 70 to rotate about axis ZZ thereby imparting a motion to linkage member 72 which is connected to the fuel metering device 49 (FIG. 14) to demand increased fuel flow to the engine without movement of throttle input arm 52. This results in a change in the distance between the throttle input arm 52 and the output arm 70 to that indicated by the distance "f" in FIG. 8 so that the rate of fuel flow to the engine differs from that commanded by power lever setting by an amount corresponding to the difference between distances "e" and "f". Clearly, this amount of trim depends on the amount of rotation of the cam element 62 caused by the trim motor 64. Whether the change is an increase or a decrease depends on the direction of roation of the cam element 62.

While many contours for the cam element 62 are possible, it has been illustrated in a manner which will also provide a trim authority envelope similar to that illustrated in FIG. 12. As action of linkage member 51 rotates shaft 53 and moves followers 60 from the central position along cam elements 62, the amount of possible displacement and corresponding trimming action are reduced.

Figure 9:
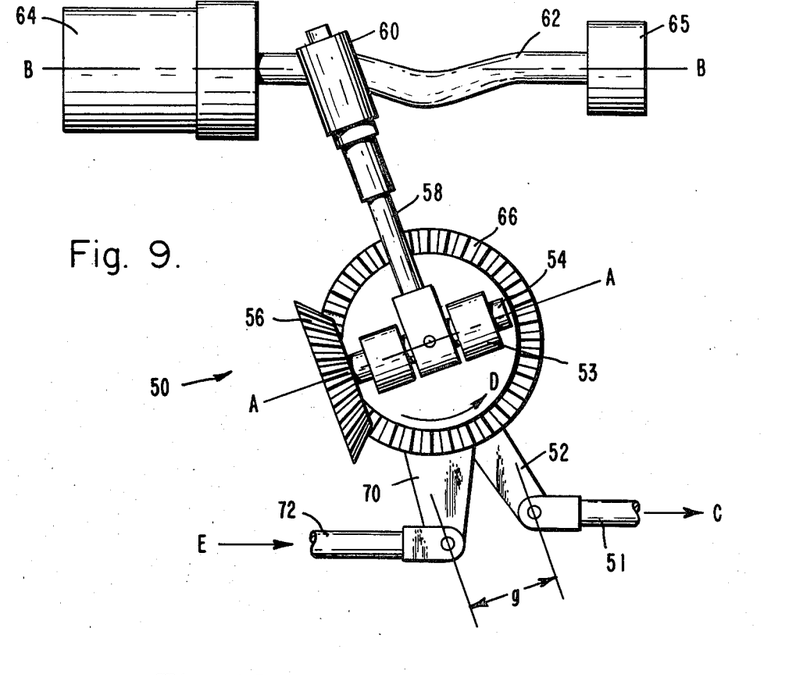
Figure 10:
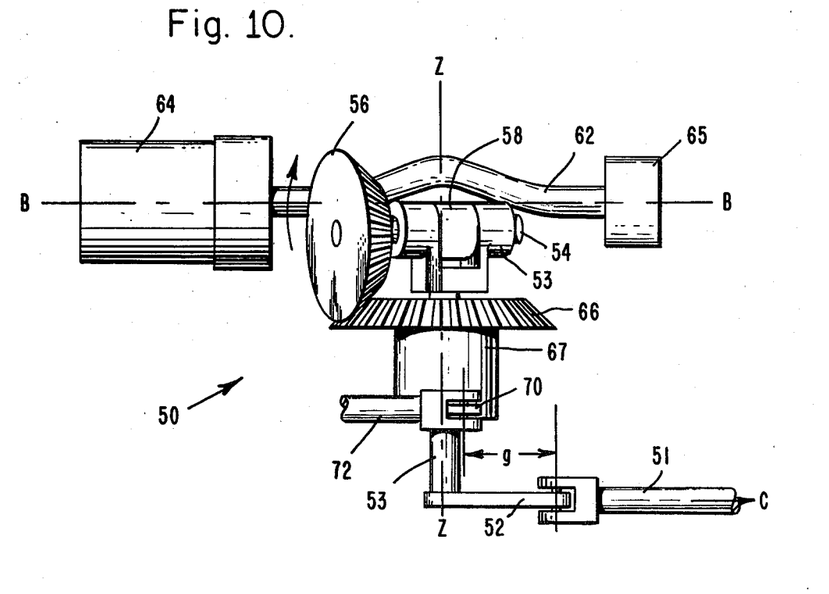

FIGS. 9 and 10 illustrate the operation when the pilot has pulled the throttle to near its lower extremity thereby commanding a near minimal amount of fuel flow to the engine. This is accomplished by rotation of input arm 52 by movement of linkage member 51 in the direction of arrow C in FIGS. 9 and 10 to cause rotation of shaft 53 about axis ZZ. As is best seen in FIG. 9, this causes axis AA to move and causes followers 60 to wipe across the centered cam 62 and move to the extreme end generally near the trim actuator motor 64. This movement just described does not cause rotation of bevel gear 66 about axis AA because of the action of cam followers 60 with cam 62, which serves to essentially freeze bevel gear 56 with respect to axis AA thereby moving bevel gear 66 about axis ZZ in the direction of arrow D. As should be readily apparent this movement about axis ZZ causes hub 67, output arm 70 and linkage member 72 to imitate the motions of their counterpart input members and move in the direction of arrow E, thereby maintaining the distance between arms 52 and 70 a constant distance "g", which is equal to the distance "e" in FIG. 7, apart. Thus, the fuel metering device 49 (FIG. 14) is set to allow only a minimum amount of fuel to flow to the engine.

A comparison of FIGS. 9 and 10 quickly illustrates that rotation of the cam 62 through action of the cam trim actuator motor 64 has no effect upon the rate of fuel flow because the followers are aligned with the straight portion of the cam 62 and not with the bowed central portion as in FIGS. 7 and 8. Thus, rotation of cam element 62 from its position in FIG. 9 to its position in FIG. 10, to demand more fuel, or downwardly into a mirror image position to demand less fuel, will have no effect because the bowed portion will not move followers 60 either upwardly or downwardly to rotate input arm 58 or shaft 54. This therefore leaves bevel gears 56 and 66, output arm 70, and linkage member 72 undisturbed and the fuel flow rate to the engine continues at the preset rate despite rotation of the cam 62.

While most of the discussion presented with respect to the second embodiment has dealt with a cam which is bowed in the center, it should be apparent to those skilled in the art that any pattern of behavior which is desired may be achieved by alteration of the cam or provision of another cam which has the capability to achieve the desired trim characteristics. In a similar vein, rotation of the cam element 62 to a starting or centered position which is 180 degrees displaced from that shown in the drawings so that the cam element is bowed away from the shaft 58 will allow for a greater degree of cam element rotation with which to activate trim input arm 58 and thereby permit more precise fine tuning or trim actuation.

Figure 11:
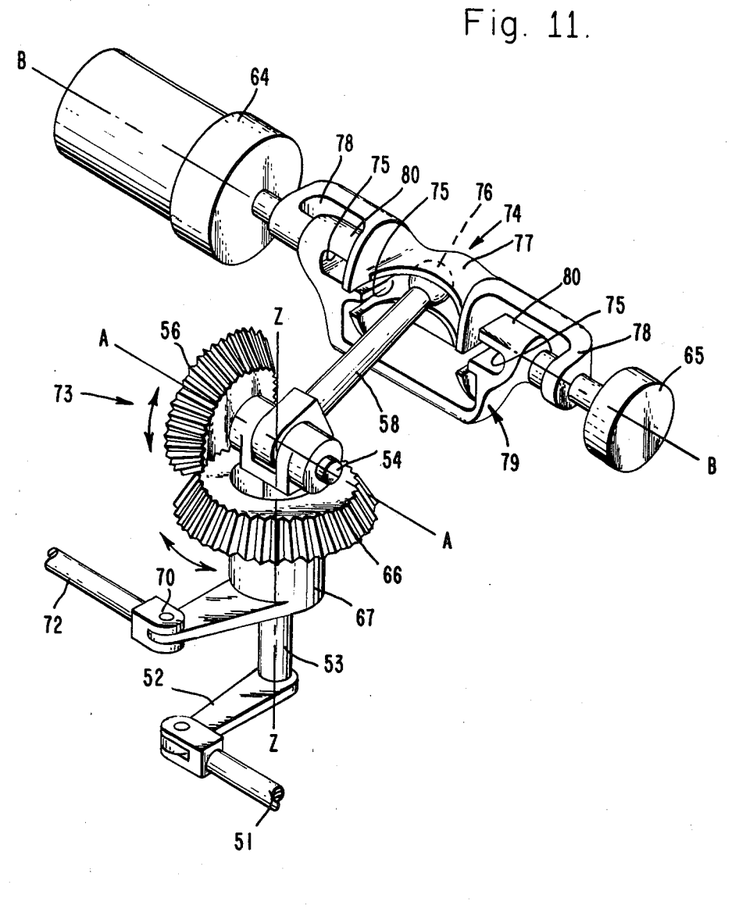
FIG. 11 is an isometric view of a third embodiment of the present invention.

Referring now to FIG. 11, a third embodiment in the form of a variable authority trim mixer 73 is shown, which differs from the second embodiment in only minor ways. For ease of understanding, elements of this embodiment identical to elements of the embodiment of FIG. 6 have been given the same reference numerals.

As in FIG. 6, throttle input through linkage member 51 is translated through interaction of bevel gears 56 and 66 to produce a corresponding motion of linkage member 72 and cam action resulting in rotation of bevel gear 56 about its axis produces trimming by increasing or decreasing the distance between the ends of throttle input arm 52 and output arm 70.

The principal distinction lies in the structure of a cam 74 driven by trim motor 64. The cam 74 is a female member in the form of a hollowed channel 75 which receives a single male follower element 76 which is secured to the end of trim input arm 58 to interact with cam 74 in a fashion equivalent to second embodiment counterparts. The cam 74 is constructed of two pieces. A bowed central portion 77 is fixed to trim motor 64 and bearing 65, to rotate about axis BB by a pair of sleeves 78. An outer portion 79 is fixed and nonmoving with respect to ground to correspond to the straightened ends of cam 62 in the second embodiment, and includes a pair of lobes 80 which axially flank the bowed central portion 77 of the cam 74. The centered nonactivated position for the bowed rotatable central portion 77, is oriented 180 degrees from that of the illustrated form of second embodiment. The channel 75, extends through both lobes 80 and the central bowed portion 77.

When the trim mixer 73 is rotated through throttle quadrant input so that the male follower 76 is in the portion of the channel 75 which is located in either of the lobes 80, activation of the trim motor 64 will not rotate trim input arm 58 and therefore not disturb the flow of fuel to the engine. However, when the male follower 76, is in the portion of the channel 75, in the central rotatable bowed member 77 of cam 74, rotation thereof through activation of the trim motor 64, will cause movement of the trim input arm 58 to influence the flow of fuel to the engine without movement of the throttle levers 17.

The variable authority trim mixers 10, 50 and 73 of the present invention therefore provide a device which can mix a primary throttle lever 17 input with a trimming input and permit a cam input to limit the effect of the trimming input in a programmed manner such that a single output is transmitted to the fuel metering device 49 (FIG. 14) of the engine. The constructions described allow the mixers of the present invention to throughput throttle lever 17 fuel commands to the engine even in the event of trim actuator failure through a direct mechanical link from the throttle lever 17 through the mixer. It should also be apparent to those skilled in the art that the input and output elements of the variable authority trim mixers 10, 50 and 73 may be preloaded with springs or other means to prevent backflash.

While the specific embodiments of the invention have been illustrated and described, so as to allow one of ordinary skill in the art to practice its teachings, what we claim and desire to secure by U.S. Letters Patent is:

1. A mechanical variable authority trim mixer of the type used in a system for controlling the flow of fuel from a source of fuel to an engine comprising:
   input means responsive to the position of a throttle lever for commanding a desired flow rate of fuel and thus a desired engine speed;
   output means operably associated with said input means for changing the flow rate of fuel in response to the input means command;
   trim means for modifying the response of said output means from that commanded by said input means and thus alter the fuel flow rate and engine speed from that commanded by the throttle lever position; and
   means for limiting the extent of modification by said trim means when the throttle is in selected portions of its stroke.

2. A mechanical variable authority trim mixer of the type used in a system for controlling the flow of fuel from a source of fuel to an engine comprising:
   input means responsive to the position of a throttle lever for commanding a desired flow rate of fuel;
   output means operably associated with said input means for changing the flow rate of fuel in response to the input means command;
   trim means for modifying the response of said output means from that commanded by said input means; and
   means for limiting the extent of modification by said trim means when the throttle is in selected portions of its stroke, and for neutralizing the effects of said trim means upon said output means when the throttle is in other critical portions of its stroke.

3. A mechanical variable authority trim mixer of the type used in a system for controlling the flow of fuel from a source of fuel to an engine, comprising:
   input means responsive to the position of a throttle lever for commanding a desired flow rate of fuel, and thus a desired engine speed;
   output means operably associated with said input means for changing the flow rate of fuel in response to the input means command;
   trim means for modifying the response of said output means from that commanded by said input means and thus alter the fuel flow rate and engine speed from that commanded by the throttle lever position; and
   means for limiting the extent of modification by said trim means when the throttle is in selected portions of its stroke, and for neutralizing the effects of said trim means upon said output means when the throttle is in other critical portions of its stroke.

4. The variable authority trim mixer of claim 1, 2, or 3, wherein said output means includes:
   mixer arm means for combining the command of said input means with the modification of said trim means into a single resultant command movement; and
   output arm means for moving in response to said resultant command movement to thereby change the flow rate of fuel.

5. The variable authority trim mixer of claim 4, wherein said input means includes:
   throttle input arm means for rotating through a limited stroke to correspond to the position of said throttle lever.

6. The variable authority trim mixer of claim 5, wherein said trim means includes:
   trim arm means for rotating through a limited path in response to a trim actuator.

7. The variable authority trim mixer of claim 6, wherein said input arm means and output arm means are rotatable about a common axis.

8. The variable authority trim mixer of claim 1, 2 or 3 wherein said input means includes rotatable input arm means responsive to throttle lever position for moving a first gear means about a first axis.

9. The variable authority trim mixer of claim 8 wherein said output means includes:
   second gear means responsive to movement of said first gear means to rotate an output arm about a second axis to change the flow rate of fuel.

10. The variable authority trim mixer of claim 9 wherein said second axis is colinear with said first axis.

11. The variable authority trim mixer of claim 1, 2 or 3, wherein said output means is unaffected by said trim means when the throttle lever is in critical regions of its stroke near the extremities of its stroke.

12. A variable authority trim mixer of the type used in a system to control the flow of fuel from a source of fuel to an engine, said variable authority trim mixer comprising:
   input arm means responsive to throttle lever position and affixed to an input shaft for moving a first gear means about the axis of said input shaft wherein said first gear is affixed to one end of a mixer shaft which mixer shaft is journalled for rotation atop said input shaft and about the axis of said mixer shaft, wherein the axes of said mixer and input shafts form a right angle;
   output means responsive to movement of said first gear about said input axis and to rotation of said first gear about said mixer axis comprising:
   a second gear means in toothed engagement with said first gear means for rotation about an output axis to move an output arm in response to movement or rotation of said first gear means wherein said output arm may be operably interrelated with an engine to control the flow of fuel thereto in response to movement thereof;
   trim means for altering the flow of fuel to the engine without movement of the throttle levers comprising:
   trim input arm means affixed to said mixing shaft to be rotatable therewith about said mixing axis and movable about said input axis, follower means affixed to the end of said trim input shaft furthest from said mixing shaft, said follower means movable by a cam means for trimming the fuel flow to the engine which cam means is rotatable about a cam axis by a trim motor, wherein said cam means includes an elongated shaft having end portions colinear with the cam axis and a central bowed portion which interacts with said follower means during rotation of the cam only when said throttle lever is in ranges intermediate the extreme ends of its stroke to thereby inpart rotation to said trim input shaft means mixer shaft and first gear means.

13. The variable authority trim mixer of claim 12 wherein said follower is a female member which receives a portion of said means.

14. A mechanical variable authority trim mixer of the type used in a system for controlling the flow of fuel from a source of fuel to an engine comprising:
input means responsive to the position of a throttle lever for commanding a desired flow rate of fuel comprising: throttle input arm means for rotating through a limited stroke to correspond to the position of said throttle lever;
output means operably associated with said input means for changing the flow rate of fuel in response to the input means command comprising: mixer arm means for combining the command of said input means with a trim command into a single resultant command movement; and output arm means for moving in response to said resultant command movement to thereby change the flow rate of fuel;
trim means for modifying the response of said output means from that commanded by said input means including: trim arm means for rotating through a limited path in response to a trim actuator;
output dowel means movable with said output arm means and operatively interactive with said mixer arm means for throughputting the resultant command movement thereof to said output arm means, input dowel means rotatable with said throttle input arm means and operatively interactive with said mixer arm means for throughputting said input means command thereto, and trim dowel means rotatable with said trim arm means and operatively interactive with said mixing arm means for throughputting said trim means modification thereto; and
means for limiting the extent of modification by said trim means when the throttle is in selected portions of its stroke comprising: cam means operatively associated with said input dowel means for altering the relationship of said input dowel means with respect to said output dowel means to thereby limit the effects of said modification upon said resultant command movement.

15. The variable authority trim mixer of claim 14, wherein axial alignment of said input and output dowel means neutralizes the effects of said modification upon the resultant command movement.

16. The variable authority trim mixer of claim 15, wherein said cam means axially aligns said input and output dowel means when said throttle lever is in selected ranges near the extremeties of its stroke.

17. The variable authority trim mixer of claim 14 or 15, wherein said input arm means and output arm means are rotatable about a common axis.

18. A mechanical variable authority trim mixer of the type used in a system for controlling the flow of fuel from a source of fuel to an engine comprising:
input means responsive to the position of a throttle lever for commanding a desired flow rate of fuel including rotatable input arm means responsive to the throttle lever position for moving a first gear means about a first axis;
output means operably associated with said input means for changing the flow rate of fuel in response to the input means command including: second gear means responsive to movement of said first gear means to rotate an output arm about a second axis to change the flow rate of fuel;
trim means for modifying the response of said output means from that commanded by said input means; including: cam means rotatable about a third axis for rotating said first gear about a fourth axis wherein said second gear is responsive to rotation of said first gear to rotate said output arm about said second axis to thereby change the flow rate of fuel; and
means for limiting the extent of modification by said trim means when the throttle is in selected portions of its stroke.

19. A mechanical variable authroity trim mixer of the type used in a system for controlling the flow of fuel from a source of fuel to an engine comprising:
rotatable input means responsive to the position of a throttle lever for moving a first gear about a first axis and thus commanding a desired flow rate of fuel;
rotatable output means operably associated with said input means and rotatable about a second axis for changing the flow rate of fuel in response to the input means command including:
second gear means responsive to movement of said first gear means and said output means to rotate said output means in response to said rotation of said input means;
trim means for modifying the response of said output means from that commanded by said input means including cam means rotatable about a third axis to rotate said first gear about a fourth axis, said second gear being responsive to rotation of said first gear to rotate said output means about said second axis and thereby change the flow rate of fuel; and
means for limiting the extent of modification by said trim means when the throttle is in selected portions of its stroke.

20. The variable authority trim mixer of claim 18 or 19 wherein said means for limiting includes:
cam contour means for limiting rotation of said first gear through rotation of said cam means in response to the position of said throttle lever.

21. The variable authority trim mixer of claim 20 wherein said contour means neutralizes the trimming effect of rotation of said cam means when said throttle lever is near the extreme ends of its stroke.

22. A mechanical variable authority trim mixer of the type used in a system for controlling the flow of fuel from a source of fuel to an engine comprising:
input means responsive to the position of a throttle lever for commanding a desired flow rate of fuel;
output means operable associated with said input means for changing the flow rate of fuel in response to the input means command;
trim means for modifying the response of said output means from that commanded by said input means;
mixer means for combining the command of said input means with the modification of said trim means into a single resultant command movement; and means for limiting the extent of modification by said trim means when the throttle is in selected portions of its stroke by altering the relationship of said input and mixer means.

23. A variable authority trim mixer for use in a system for controlling the flow of fuel from a source of fuel to an engine of the type having a throttle lever movable through a limited stroke defining a plurality of positions which command desired fuel flow rates, selectively operable fuel trimming actuator movable through a limited range of positions which indicate a desired departure from the fuel flow rate commanded by the throttle lever position, and a fuel metering device operably associated with the engine to meter the flow of fuel, said trim mixer comprising:
 output means connected for controlling the fuel metering device;
 input mixer means operably associated with the output means for combining a plurality of inputs into a single resultant and throughputting said resultant to said output means;
 throttle input means operably associated with the throttle lever and input mixer means for throughputting to said input mixer means a first input which is indicative of the throttle lever position;
 trim input means operably associated with the trimming actuator and input mixer means for throughputting to said input mixer means a second input which is indicative of the trimming actuator position; and
 means sensitive to the throttle lever position and operably associated with the input mixer means for modifying the effects of said trim input upon said resultant when said throttle lever is in selected ranges of its stroke, and neutralizing the effects of said trim input when the throttle lever is in other critical portions of its stroke.

24. A variable authority trim actuator for use in a system for controlling the flow of fuel from a source of fuel to an engine comprising:
 input arm means rotatable about a first axis in response to a throttle lever position wherein said input arm includes at least one guide means for connecting a throttle input arm hub and cap, and, constraining the movement of a bored block which is movable axially on the guide;
 input dowel means affixed at one end to said bored block, said input dowel means having a head thereon for moving in response to said throttle input arm position;
 a movable elongated input mixer arm means having first and second slots therein wherein said head of said input dowel means is inserted in said first slot to be movable therein;
 trim means for moving said input mixing arm in response to trim signals including trim input arm means rotatable through a limited stroke by a trim motor about a second axis wherein said trimming arm means includes trimming dowel and head means for insertion in said second slot;
 output arm means rotatable about a third axis for controlling the flow of fuel in response to the position of said mixing arm means wherein said output arm means includes an output dowel and head means generally near one end thereof for insertion in said first slot to be movable in response to the position of said mixing arm means; and
 cam means for limiting the effect of said trimming means upon said output means through said mixing means wherein said input means includes a cam follower means for riding upon a surface of said cam to vary the axial orientation of said input dowel means with respect to said output dowel means in response to throttle input means position, the effects of said trim means upon said output arm means becoming more diminished as said input and output dowels approach axial alignment, said cam means axially aligning said input and output dowel means generally near the extreme ends of the throttle lever stroke, and said first and second axes being colinear.

25. A method of providing a variable trim authority to a system for controlling the flow of fuel from a source of fuel to an engine comprising the steps of:
 commanding a desired fuel flow rate and thus an engine speed by the position of a throttle lever;
 modifying the desired fuel flow rate and thus the engine speed with a trim command;
 limiting the extent of modification permitted when the throttle lever is in selected portions of its stroke;
 neutralizing the extent of modification when the throttle lever is in critical portions of its stroke; and
 throughputting the modififed fuel flow rate command to a fuel metering device associated with the engine.

26. The method of claim 25, wherein said neutralizing step includes neutralizing the effects of said modification when the throttle lever is in critical regions of its stroke generally near the extreme limits of its stroke.

* * * * *